United States Patent [19]
Buttner

[11] 4,426,095
[45] Jan. 17, 1984

[54] FLEXIBLE SEAL

[75] Inventor: Robert C. Buttner, Syracuse, N.Y.

[73] Assignee: Concrete Pipe & Products Corp., East Syracuse, N.Y.

[21] Appl. No.: 306,078

[22] Filed: Sep. 28, 1981

[51] Int. Cl.³ ............................................. F16J 15/32
[52] U.S. Cl. ................................. 277/207 A; 227/211
[58] Field of Search ................................. 277/207–211

[56] References Cited
U.S. PATENT DOCUMENTS

| | | | |
|---|---|---|---|
| 785,116 | 3/1905 | Perry | 277/211 |
| 2,205,910 | 6/1940 | Raybould | |
| 3,573,871 | 4/1971 | Warner | 277/208 |
| 3,702,193 | 11/1972 | Flegel et al. | 277/209 |
| 4,128,251 | 12/1973 | Gaither et al. | |
| 4,147,368 | 4/1979 | Baker et al. | 277/207 A |
| 4,315,630 | 2/1982 | French et al. | 277/207 A |

FOREIGN PATENT DOCUMENTS 1248392  8/1967  Fed. Rep. of Germany ... 277/207 A

*Primary Examiner*—Robert I. Smith
*Attorney, Agent, or Firm*—Bruns & Jenney

[57] ABSTRACT

This invention relates to a composite flexible seal for providing a fluid tight joint between a pipe section and the inside surface of a receiving opening. The seal includes a slightly elongated tubular body formed of an elastomeric material and a spring-like metal snap ring encapsulated within the body. The ring can be collapsed inwardly upon iself reducing the outside diameter of the body and allowing the seal to be inserted into the receiving opening. Once situated in the opening the ring is expanded causing the seal to be locked in fluid tight contact against the wall of the opening. A pipe section is inserted into the seal opening to complete the joint.

5 Claims, 7 Drawing Figures

FLEXIBLE SEAL

BACKGROUND OF THE INVENTION

This invention relates to a flexible seal and, in particular, to a flexible seal that is ideally well suited for forming a fluid tight joint between a sewer pipe section and an opening into which the pipe section is fitted.

As disclosed in U.S. Pat. No. 3,787,061 an elastomeric tubular pipe seal is disclosed for joining a pipe section to a manhole riser. A receiving groove that compliments the outer contour of the seal is machined or otherwise formed in the pipe receiving opening of the riser and the seal is seated therein. The pipe section is inserted into the seal opening to complete the joint. A wound spring is contained within an opening formed in the seal which is designed to automatically load against the pipe to lock the seal thereto. The ends of the spring are brought out of the seal and positioned in an expanded chamber formed in the riser. During assembly, the spring ends are engaged by a special tool and the spring is expanded to permit the pipe to be inserted therein. The seal, however, sometimes is pinched or rolled against the sharp edges of the receiving groove during insertion and thus can become torn or otherwise damaged. The expansion of the spring within the limited confines of the opening is oftentimes difficult to achieve. Furthermore, the exposed parts of the spring are susceptible to attack by moisture and other corrosive materials that might be found in and about the seal which can lead to early failure of the seal.

In U.S. Pat. No. 3,958,313, a boot-like seal is disclosed that is also used to join a pipe section to a manhole riser. The boot, as described is a necked down, funnel shaped elastomeric member. In assembly, the neck of the boot is clamped by a metal collar to the pipe section and the wide end of the boot is passed into an opening formed in the riser. The boot is locked to the wall of the opening by means of a special band that includes a toggle joint which, when actuated, expands the band against the inside surface of the enlarged end of the boot. The toggle joins the two ends of the band and normally holds the band in a contracted condition. To expand the band, a closing force of about 1000 psi is exerted by a pneumatic tool directly against the toggle joint. Although the pressure closes the joint, it also destroys the toggle so that the band cannot be released without destroying the unit. Accordingly, if a fluid tight seal is not achieved on the first closure attempt, the seal must be removed from the assembly and replaced with a new unit which, of course, is relatively expensive. By the same token, if the seal must be removed for maintenance purposes or the like, it must be similarly replaced with a new unit. Boot type seals are also highly susceptible to being cut upon the sharp front edge of the riser opening if the connected pipe sections are moved or realigned in the opening. Sharp rocks, tools or other types of foreign objects can also easily penetrate the exposed section of the boot during back filling or excavating operations. Lastly, it should be noted that the expandable band of the seal unit is continually exposed to moisture and other corrosive substances carried by the sewer system and, unless fabricated of special high priced corrosion resistant materials, the bands will fail within a relatively short period of time.

SUMMARY OF THE INVENTION

It is a primary object of this invention to improve flexible pipe seals.

A further object of the present invention is to provide a pipe seal that can be easily installed and removed in assembly without the need of special tools.

A still further object of the present invention is to provide a flexible pipe seal that will permit a wide latitude in pipe alignment within a pipe receiving hole.

Another object of the present invention is to provide pipe seal that is fully contained within a receiving opening so that the seal cannot be punctured or otherwise damaged by sharp corners or foreign objects.

Yet another object of the present invention is to provide a flexible pipe seal that can be reused without destroying the integrity of the seal.

Still another object of the present invention is to minimize the effects of corrosion upon a fluid tight pipe seal.

These and other objects of the present invention are attained by means of a composite seal having a tubular elastomeric body section that encapsulates a resilient metal ring that can be collapsed inwardly on itself to reduce the outside diameter of the seal. The collapsed seal is inserted into a pipe receiving opening and then snapped back into sealing contact against the wall of the opening. The inner wall of the seal contains depending inwardly extended circular fins that are capable of engaging the outside surface of a pipe that is passed into the seal thereby establishing a fluid tight flexible joint within the opening.

BRIEF DESCRIPTION OF THE DRAWINGS

For a better understanding of these and other objects of the invention, reference is had to the following detailed description of the invention which is to be read in association with the accompanying drawings, wherein.

DESCRIPTION OF THE INVENTION

Figure 1:
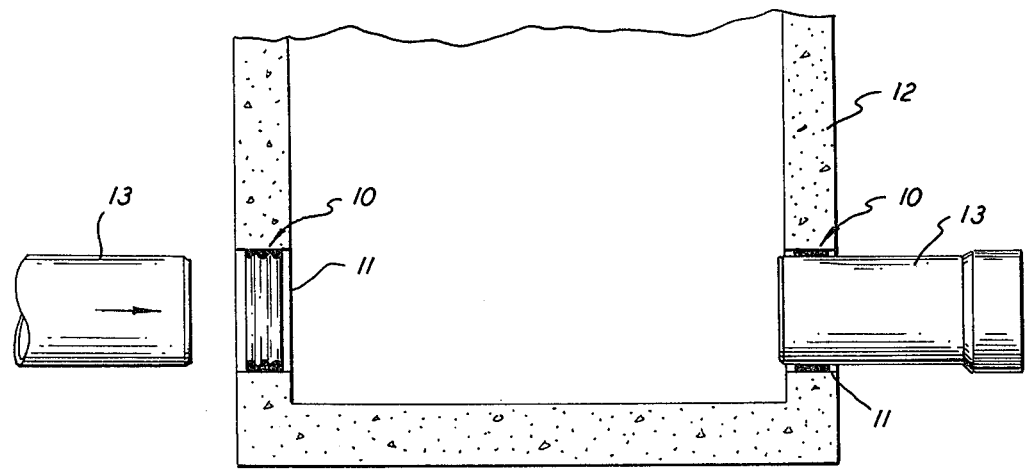
FIG. 1 is a side elevation of a manhole riser showing a seal embodying the teachings of the present invention mounted therein so as to form a fluid tight joint between pipe sections and the riser.
Figure 2:
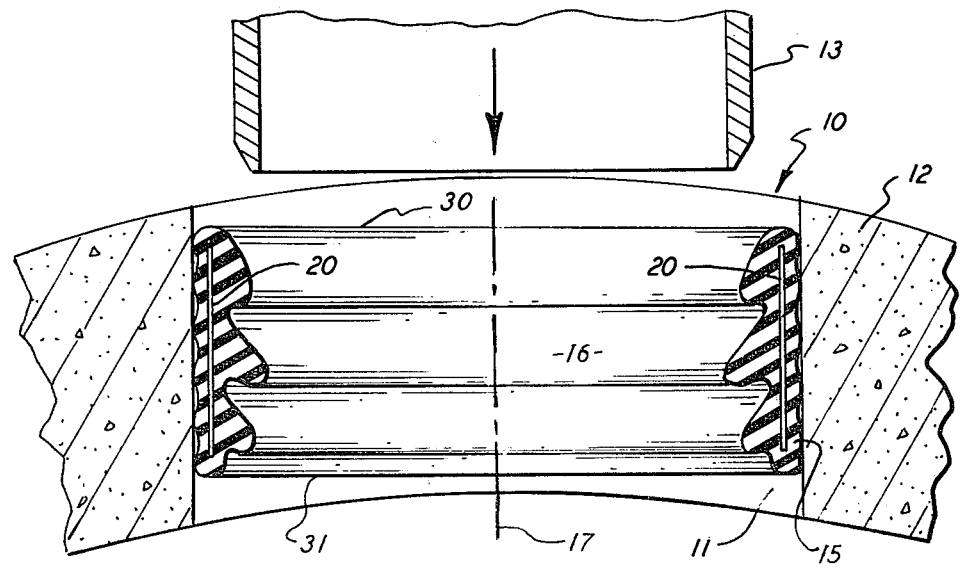
FIG. 2 is an enlarged partial top plan view showing the seal illustrated in FIG. 1 positioned within one of the riser openings.

Turning initially to FIGS. 1-4, wherein like parts are identified by like numerals, there is shown a flexible seal, generally referenced 10, which embodies the teachings of the present invention. In this particular embodiment of the invention, the seal is employed to form a fluid tight joint between a sewer pipe section 13 and the wall of a pipe receiving opening 11 formed in a manhole riser 12. As best seen in FIGS. 1 and 2, the seal is entirely contained within a cylindrical opening that is cast or otherwise formed in the manhole riser. The present seal, due to its unique structure, does not require seating grooves or other complex and expensive retaining devices to be machined or mounted within the receiving opening that are normally required to prevent axial displacement of the seal in assembly. As will become evident from the disclosure below, the present seal can be easily positioned in the opening and snapped in place to provide a tight seal against the cylindrical surface of the riser opening without the need of special tools or complex mounting procedures. It should also be noted that the seal can also be easily removed and reinstalled without harm whereby the seal can be reused any number of times.

Seal 10 includes two main sections which are a tubular body section 15 that is formed of a rubber-like elastomeric material and a resilient metal ring 20 that is formed of a spring-like material that enables the ring to be collapsed inwardly upon itself and then snapped back into its normal circular posture. The ring is entirely encapsulated within the elastomeric body section to prevent the metal ring surfaces from being exposed to moisture or other corrosive substances that might attack the metal and cause premature failure of the seal. Accordingly, the seal will remain generally impervious to corrosion which can seriously harm other types of seals presently known and used in the art.

Figure 3:
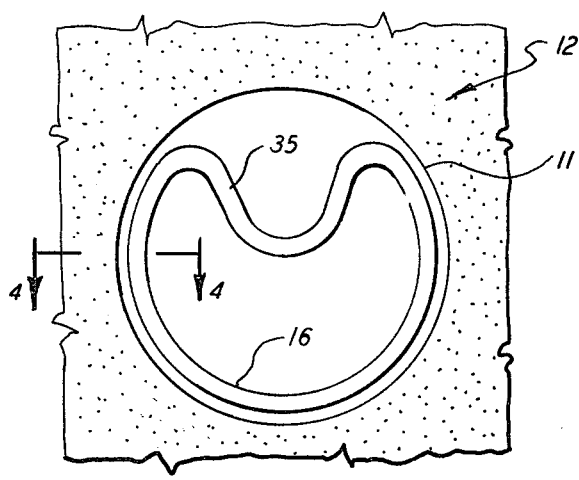
FIG. 3 is a front view of the riser opening showing a seal situated therein in a collapsed condition.

The body section of the seal has a central opening 16 formed therein that is capable of slidably receiving a pipe section. The outside diameter of the body section is slightly larger than the diameter of the riser opening. To mount the seal within the opening, the seal is initially collapsed as illustrated in FIG. 3. This is achieved by applying sufficient downward pressure against one quadrant of the seal to cause the ring, and thus the seal, to fold inwardly upon itself. A U-shaped indentation 35 is thus created in the seal structure which shrinks the outside diameter of the seal to a size that is slightly less than the diameter of the riser opening. As a result, the seal can be conveniently passed into the riser opening and centered therein.

To lock the seal in the cylindrical opening, the collapsed seal is snapped back into its normal circular posture by applying outward pressure against the indented section 35. Due to the interference fit provided between the outer periphery of the seal and the wall of the receiving opening, the elastomeric seal body is deformed against the receiving wall to provide a fluid tight seal. Under the influence of the ring a compressive force is applied against the wall which securely holds the seal in the opening. It has been found that by providing about 1/16 of an inch interference between the wall and the seal the seal will resist an extremely high axial load without being displaced or rolled within the opening. The axial loading that can be accommodated by the seal without shifting is considerably higher than the loads normally encountered under actual working conditions.

In practice, the ring is centered upon the axial centerline 17 of the body section so that a uniform distance d (FIG. 4) is maintained between the outside surface of the ring and the outside surface of the body. As a result of this construction, the ring delivers a uniform hold against the receiving wall about the entire outer periphery of the seal. The outer surface 21 of the body section is further provided with outwardly protruding circular ribs 22—22. The ribs, which preferably form a depending part of the seal body, are equally spaced along the length of the seal. When the seal is expanded within the opening the circular ribs are deformed individually against the wall and thus tend to accommodate any irregularities in the size of the wall opening as well as providing added holding power to the system.

Figure 4:
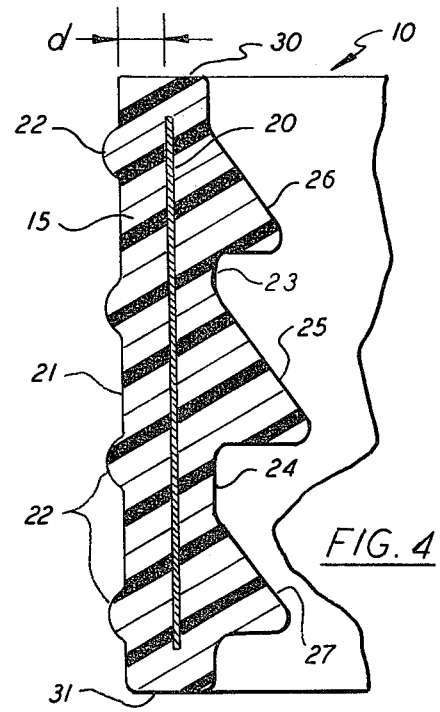
FIG. 4 is an enlarged section view through the seal shown in FIG. 3 which is taken along lines 4—4.

Inwardly protruding circular fins also depend inwardly from the inside wall 23 of the body section. In the present embodiment of the invention, three fins are utilized. They include an intermediate fin 25 that is centrally located within the seal opening 16 and two end fins 26 and 27 that are located to either side of the intermediate fin. As best seen in FIG. 4, the radial length of the intermediate fin is greater than that of the two other fins. In all cases, however, the cylindrical opening of the fins is less than the outside diameter of the pipe section which is to be received within the seal opening so that each fin is capable of firmly and securely grasping the outer periphery of the pipe and forming a fluid tight seal thereagainst.

As can be seen, each fin is obliquely positioned within the seal opening so that it slants rearwardly from the front pipe receiving face 30 of the seal toward the rear seal face 31. By obliquely positioning the fins within the seal opening as shown, all the fins will deflect uniformly in one direction when the pipe section is passed into the seal. This, in turn, eliminates the danger of the fins being inadvertently twisted or rolled under during assembly. Slanting the fins rearwardly facilitates installation of the pipe section and also applies an axially directed holding force against the pipe that resists any tendency of the pipe to pull out of the seal once it is fitted therein. Stepping the length of the fins allows the seal to be compressively loaded and unloaded in stages between the pipe and the riser thereby further facilitating installation and removal of the pipe section. Deterioration of the seal is also minimized by placing all the rubber in a state of compression.

To insert a pipe section in the seal, the received end of the pipe is coated with a lubricant that will not adversely effect the seal rubber and the pipe is driven axially into the seal opening 16. Pipe sections have been driven into seated seals using power equipment without adversely effecting or displacing the seated seal within the opening. Once the pipe has been driven through the seal, the seal is compressed uniformly between the pipe and the riser and almost nothing can be done to impair the fluid tight integrity of the joint. Tests of the joint have demonstrated that the loaded seal can withstand relatively high hydrostatic heads without leakage.

To remove the seal, the pipe section is again lubricated and pulled out of the seal opening. A pry bar or any other similar type prying tool is inserted between the seal and wall of the opening and the seal is collapsed and removed from the opening. The removal procedures will not normally cause harm to the seal structure and the seal can therefore be reused as required thus providing a savings to the user.

Preferably, the axial length of the seal is less than that of the receiving opening so that the seal is fully contained within the opening. The contained seal will not be exposed to the sharp corner edges of the opening and, as a result, the seal can not be cut or punctured in the event the pipe section is axially displaced after assembly. Typically, the receiving hole is formed to provide about a one to two inch clearance between the wall of the opening and the outside surface of the pipe. A seal having an axial length of about four inches will provide sufficient flexibility with this type of clearance to permit the pipe to be deflected about 12° off axis without adversely affecting the integrity of the seal. Because the seal does not project beyond the ends of the riser opening, it is shielded from foreign objects which might otherwise penetrate the seal.

Figure 5:
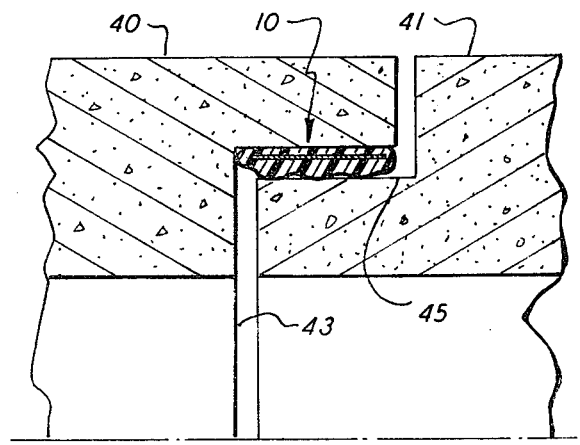
FIG. 5 is a side elevation showing the seal forming a joint between two connected pipe sections.

FIG. 5 shows the present seal 10 being used to form a fluid tight joint between two sewer pipe sections 40 and 41. The seal is sized so that it can be slipped in a collapsed condition into the recessed shoulder 43 formed in the end of pipe 40. The seal is snapped into place as explained above and the reduced nose flange 45 of the second pipe 41 is inserted into the seal to establish a secure but flexible joint. As should be evident from the disclosure above, the seal can be easily removed from the pipe and later reused thus realizing a considerable savings when compared to destructable pipe seals presently known and used in the art.

Figure 6:
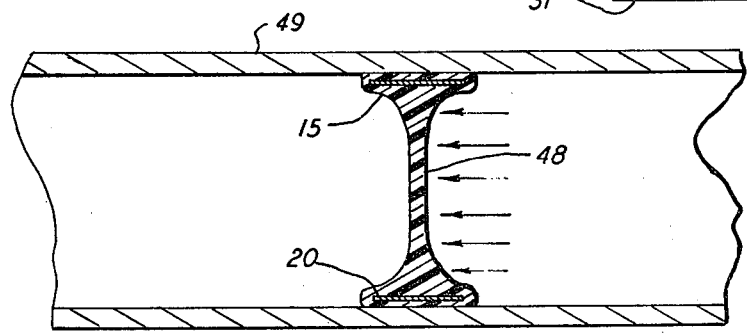
FIG. 6 is also a side elevation of a pipe section showing another embodiment of the invention wherein the seal is utilized to block the flow of fluids through the pipe.

FIG. 6 shows another embodiment of the invention in which the center portion of seal body 15 is completely closed by an elastomeric diaphragm 48 that extends across the seal opening. Preferably the diaphragm is cast as an integral part of the seal body so that the seal and diaphragm form a single piece unit. In this embodiment, the seal is snapped into sealing contact against the interior wall of a pipe 49 to temporarily block the flow of fluids through the pipe. Here again the reusable seal can be easily installed and removed to provide a temporary block in the line which is particularly useful when repairs on the system are being made.

Figure 7:
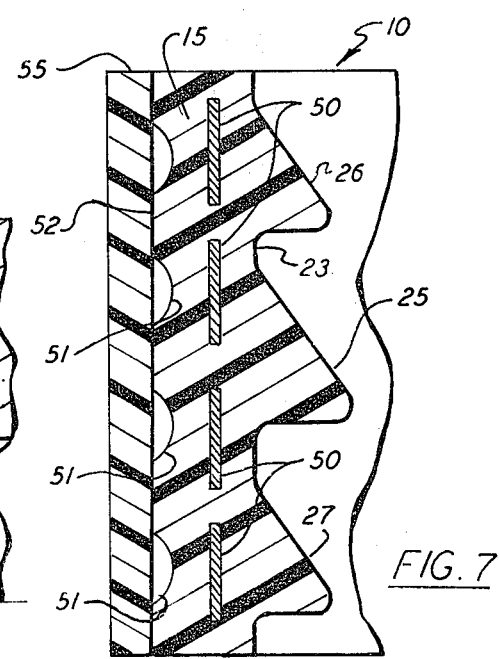
FIG. 7 is a view similar to FIG. 4 illustrating a segmented metal ring encapsulated in the body of the seal.

The seal shown in FIG. 7 is similar to that shown in FIG. 3. The continuous ring, however, has been replaced by a series of coaligned bands 50—50 which provide for the same snap in function as the single bands. The multiband arrangement is useful for applying a more uniform holding pressure against a wall opening that is slightly tapered out of round or misaligned during the forming process. The separate bands individually compensate for any irregularities in the opening wall and combine to provide for a tight seal. The outer surface 52 of the body section 15 contains a number of grooves 51—51 which allow the incompressible rubber body to deform when the seal is compressed against the opening. By using grooves in place of the previously noted deformable ribs, a generally smooth cylindrical outer surface is presented to the inner wall of the opening. The smooth outer surface also allows an elastomeric tubular sleeve 55 to be slipped over the seal as shown in FIG. 7. Oftentimes, the holes formed in a manhole riser or the like will be oversized due to faulty fabrication procedures, improper machining operations or the use of a damaged forming tool. When this occurs, the seal body cannot lock securely against the opening and leakage will result. By placing the elastomeric sleeve 55 over the seal body, the working diameter of the seal is increased to compensate for the increased size of the opening.

While this invention has been described with reference to the details as set forth above, it is not limited to the specific structure as disclosed and the invention is intended to cover any modifications or changes as may come within the scope of the following claims. The seal, for example, can be used as a wall thimble for sealing any type of conduit passing into a structure.

I claim:

1. A composite flexible seal for providing a leak-proof joint within an annular space between the outer surface of a cylindrical pipe and the continuous unbroken surface of a circular opening passing axially into a pipe receiving member through one wall thereof, said seal including an annular body section fully contained within said opening that is formed of an elastomeric material, said body section having an outer surface having a diameter that is slightly greater than the diameter of the circular opening passing into said pipe receiving member and an inner surface having a diameter that is greater than the outside diameter of said pipe, a cylindrical ring encapsulated within the said body section that has an outside diameter that is less than the diameter of the opening in the pipe receiving member, said ring being formed of a spring-like material which permits the body section to be collapsed inwardly so that the body can be inserted axially into said circular opening and then snapped back into a circular condition to deform the body section into locking contact around the entire wall periphery of the opening to secure the body therein, and at least one circular deflectable fin depending inwardly from the body in a radial direction to encircle in sealing contact the outside surface of a pipe that is passed into the seal to form a leak-proof joint between the pipe and the receiving member.

2. The composite seal of claim 1 wherein said at least one deflectable fin is formed of an elastomeric material that is a dependent part of said body section.

3. The composite seal of claim 2 wherein a plurality of radially directed fins depend from the seal body.

4. The composite seal of claim 2 wherein the fins are inclined from the front of said body section toward the back thereof in regard to the direction of said pipe insertion therein.

5. The composite seal of claim 1 wherein the axial length of the body section is at least four times the radial thickness of said body section.

* * * * *